UNITED STATES PATENT OFFICE.

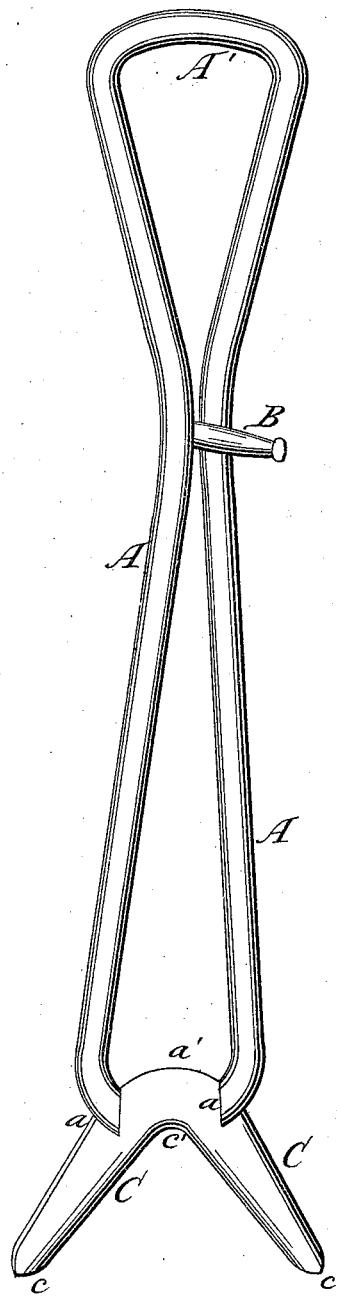
J. Fasig,
Hay Knife,
No 19,921. Patented Apr. 13, 1858.

JNO. FASIG, OF JACKSON, OHIO.

HAY-KNIFE.

Specification of Letters Patent No. 19,921, dated April 13, 1858.

*To all whom it may concern:*

Be it known that I, J. FASIG, of Jackson, in the county of Ashland and State of Ohio, have invented certain new and useful Improvements in Hay-Knives; and I do hereby declare the following to be a full and complete description thereof, reference being had to the accompanying drawings, and to the letters of reference marked thereon, making part of this specification.

The figure is a view of my improved hay knife.

A, represents the shank of the knife, B, a piece inserted in the shank, at a right angle to it, and at such a distance from the knife C, as to be convenient for the person operating the knife to place his foot upon it, to push the knife down upon the hay.

The knife C, is, in form, nearly a right angle, the whole inner edge of the angle being a cutting edge, and the ends $c$, $c$, being of such a shape as to enter the hay easily. The ends of the shank A, are inserted in or joined to the knife at $a$, $a$, the points where the power can be most advantageously applied; if the power were to be applied at $a'$, the tendency would be to break or split the knife, across from $a'$, to $c'$; if the power were to be applied lower, there would still be the same tendency, and a loss of power.

The knife being thrust into the hay, the ends $c$, $c$, enter readily, and power being applied by placing the hand upon the handle $A'$, and the foot upon the piece B, all the hay within the angle of the knife, is cut, the sides of the angle preventing the hay from being pushed away, by the force applied to cut it.

In the use of the ordinary hay knife, the force applied to cut the hay, is but partially expended in cutting the hay, because the form of the knife causes a part of the hay to slip away before it, consequently, it requires more strokes of the knife, and more exertion to cut the same amount of hay, than is required with my knife, as all the hay being cut is confined between the angle of the cutting edges, and is pressed together. In the use of my knife, all the force exerted, is expended in cutting the hay, consequently, much more hay can be cut in the same time, and by the same amount of labor, or less.

What I claim as my improvement, and desire to secure by Letters Patent, is,—

The angular knife C, constructed substantially in the manner and for the purpose set forth, it being attached to the shank A as described.

JOHN FASIG.

Witnesses:
S. H. MARTIN,
W. H. BURRIDGE.